(12) United States Patent
Etoh et al.

(10) Patent No.: US 8,673,197 B2
(45) Date of Patent: Mar. 18, 2014

(54) MULTI-LAYER STRUCTURE AND METHOD OF PRODUCING THE SAME

(75) Inventors: Makoto Etoh, Yokohama (JP); Hiroaki Goto, Yokohama (JP); Atsushi Kikuchi, Yokohama (JP)

(73) Assignee: Toyo Seikan Kaisha, Ltd., Tokyo (JP)

(*) Notice: Subject to any disclaimer, the term of this patent is extended or adjusted under 35 U.S.C. 154(b) by 195 days.

(21) Appl. No.: 13/213,027

(22) Filed: Aug. 18, 2011

(65) Prior Publication Data

US 2011/0304069 A1 Dec. 15, 2011

Related U.S. Application Data

(62) Division of application No. 11/597,709, filed as application No. PCT/JP2005/010205 on May 27, 2005, now abandoned.

(30) Foreign Application Priority Data

May 31, 2004 (JP) ................................. 2004-161647

(51) Int. Cl.
*B29C 37/00* (2006.01)
(52) U.S. Cl.
USPC ................. 264/255; 264/173.16; 264/173.19; 425/133.1; 425/132
(58) Field of Classification Search
USPC ............. 264/173.11–173.14, 173.16, 173.19, 264/174.1; 425/130, 132, 133.1; 220/646; 428/72, 339, 516
See application file for complete search history.

(56) References Cited

U.S. PATENT DOCUMENTS

| 3,416,691 | A | 12/1968 | Piker |
|---|---|---|---|
| 3,744,664 | A | 7/1973 | George |
| 4,056,344 | A | 11/1977 | Lemelson |
| 4,410,602 | A | 10/1983 | Komoda |
| 4,476,080 | A | 10/1984 | Komoda |
| 4,596,236 | A | 6/1986 | Eide |
| 4,712,990 | A | 12/1987 | Kudert et al. |
| 4,824,618 | A | 4/1989 | Strum et al. |
| 4,876,052 | A | 10/1989 | Yamada et al. |
| 4,885,121 | A | 12/1989 | Patel |
| 4,892,699 | A | 1/1990 | Kudert et al. |
| 4,895,504 | A | 1/1990 | Kudert et al. |
| 4,904,512 | A | 2/1990 | Yamada et al. |
| 4,931,246 | A | 6/1990 | Kudert et al. |
| 4,934,915 | A | 6/1990 | Kudert et al. |
| 5,104,305 | A | 4/1992 | Kawaguchi et al. |
| 5,162,121 | A | 11/1992 | Kawaguchi et al. |

(Continued)

FOREIGN PATENT DOCUMENTS

| EP | 0 429 654 A1 | 6/1991 |
|---|---|---|
| EP | 1 676 687 A1 | 7/2006 |

(Continued)

*Primary Examiner* — Joseph S Del Sole
*Assistant Examiner* — Nahida Sultana
(74) *Attorney, Agent, or Firm* — Sughrue Mion, PLLC

(57) ABSTRACT

A multi-layer structure comprising a functional resin layer obtained by covering a core layer of a base body resin or a second functional resin with a shell layer of a first functional resin, and a base body resin layer containing the functional resin layer therein. The layers of the functional resins are formed at positions where they are allowed to exhibit their functions to a sufficient degree, a plurality of functions can be imparted, and a molten resin mass having the above multi-layer structure can be formed by the compression-forming.

2 Claims, 4 Drawing Sheets

(56) References Cited

U.S. PATENT DOCUMENTS

| | | |
|---|---|---|
| 5,316,841 A | 5/1994 | Kohama et al. |
| 5,403,529 A * | 4/1995 | Kawaguchi .................. 264/167 |
| 5,507,409 A | 4/1996 | Paradine |
| 5,651,998 A | 7/1997 | Bertschi et al. |
| 5,798,069 A | 8/1998 | Bertschi et al. |
| 5,843,501 A | 12/1998 | Rubin et al. |
| 5,853,772 A | 12/1998 | Kudert et al. |
| 5,915,580 A | 6/1999 | Melk |
| 5,968,558 A | 10/1999 | Kudert et al. |
| 5,975,871 A | 11/1999 | Kudert et al. |
| 6,179,203 B1 | 1/2001 | Toussant et al. |
| 6,286,705 B1 | 9/2001 | Mihalov et al. |
| 6,332,767 B1 | 12/2001 | Kudert et al. |
| 6,344,249 B1 | 2/2002 | Maruyama et al. |
| 6,350,401 B1 | 2/2002 | Gellert et al. |
| 6,440,350 B1 | 8/2002 | Gellert et al. |
| 6,648,622 B1 | 11/2003 | Gellert et al. |
| 6,655,945 B1 | 12/2003 | Gellert et al. |
| 7,341,684 B2 | 3/2008 | Imatani et al. |
| 8,157,555 B2 * | 4/2012 | Fukabori et al. .............. 425/132 |
| 2002/0036366 A1 * | 3/2002 | Maruyama et al. ........ 264/328.8 |
| 2002/0192404 A1 | 12/2002 | Swenson |
| 2003/0124209 A1 | 7/2003 | Swenson |
| 2004/0124567 A1 | 7/2004 | Stangier |
| 2004/0202743 A1 | 10/2004 | Pearson |
| 2006/0051444 A1 | 3/2006 | Imatani et al. |
| 2009/0074898 A1 * | 3/2009 | Fukabori et al. .............. 425/132 |
| 2013/0095265 A1 * | 4/2013 | Mitadera ...................... 428/36.7 |
| 2013/0255725 A1 * | 10/2013 | Mori et al. ...................... 134/18 |

FOREIGN PATENT DOCUMENTS

| | | |
|---|---|---|
| JP | 1-294426 A | 11/1989 |
| JP | 2-98415 A | 4/1990 |
| JP | 07028852 U | 5/1995 |
| JP | 9-216315 A | 8/1997 |
| JP | 2000-503942 A | 4/2000 |
| JP | 2000-326393 A | 11/2000 |
| JP | 2002-328237 A | 11/2002 |
| JP | 2002-361720 A | 12/2002 |
| JP | 2003-33964 A | 2/2003 |
| JP | 2003-191277 A | 7/2003 |
| WO | 9727050 | 7/1997 |
| WO | 2004065101 A1 | 8/2004 |

* cited by examiner

MULTI-LAYER STRUCTURE AND METHOD OF PRODUCING THE SAME

CROSS-REFERENCE TO RELATED APPLICATIONS

This application is a Rule 53(b) Divisional of U.S. patent application Ser. No. 11/597,709 filed Dec. 15, 2006, which is a 371 of PCT Application No. PCT/JP2005/010205 filed May 27, 2005, which claims benefit to Japanese Patent Application No. 2004-161647 filed May 31, 2004. The above-noted applications are incorporated herein by reference in their entirety.

TECHNICAL FIELD

The present invention relates to a multi-layer structure having a base body resin layer of a thermoplastic resin and a functional resin layer of a functional resin. More specifically, the invention relates to a multi-layer structure having a layer structure in which functional resins such as a barrier resin and an oxygen-absorbing resin are allowed to efficiently exhibit their functions, and to a method of producing the same.

BACKGROUND ART

In the field of packaging containers, there have been used a variety of resins and resin compositions capable of exhibiting such functions as heat resistance, barrier property, oxygen-absorbing property and the like properties. These functional resins are used in combination with a base body resin which chiefly works to maintain the formability of the structure.

As the functional resins, there have been known gas-barrier resins such as ethylene/vinyl alcohol copolymers, and oxygen-absorbing resin compositions obtained by blending a resin base body selected from the group consisting of an ethylene/vinyl alcohol copolymer, nylon resin and olefin resin with an oxidizing polymer having an oxygen-absorbing rate larger than that of the resin base body and an oxidizing catalyst or an oxidation initiator (JP-A-2001-39475).

It has further been known to use the functional resins for the containers and the container closures.

For example, JP-B-2-60499 discloses a compression-formed article of a multi-layer structure comprising a first synthetic resin layer and a second synthetic resin layer formed by using different synthetic resins, the first synthetic resin layer surrounding substantially the whole second synthetic resin layer, and a method of its production, using a gas-barrier resin as the second synthetic resin layer.

DISCLOSURE OF THE INVENTION

In the multi-layer structure bodies such as container closures and containers having a multi-layer structure of functional resins and other resin such as a base body resin, however, it is difficult to place the layers of the functional resins at positions where excellent functions possessed by the functional resins can be exhibited to a sufficient degree.

That is, as disclosed in the above-mentioned JP-B-2-60499, a functional resin is used for the container closures for foods being positioned in the central portion of the structure wall in order to avoid the effect of water in the case of a gas-barrier resin such as an ethylene/vinyl alcohol copolymer or in order to avoid a place that comes in direct contact with the food when an oxygen-absorbing agent is contained therein. When the functional resin which is an oxygen-absorbing resin is covered for its surfaces with a thick base body resin, however, oxygen that is to be absorbed is prevented from efficiently arriving at the layer of the oxygen-absorbing resin, making it difficult to efficiently exhibit oxygen-absorbing property.

On the other hand, if the amount of the functional resin is increased so as to exist up to near the surface of the structure, a problem arouses concerning the cost and, besides, deteriorating the mechanical strength and the formability.

It has also been attempted to combine a plurality of layers of the functional resins to enhance the effect encountering, however, the difficulty in efficiently forming the layers by the compression-forming.

It is therefore an object of the present invention to provide a multi-layer structure in which layers of functional resins are formed at positions where it is allowed to exhibit their functions to a sufficient degree.

Another object of the present invention is to provide a method of efficiently producing a multi-layer structure in which layers of functional resins are formed at positions where it is allowed to exhibit their functions to a sufficient degree relying upon the compression-forming.

A further object of the present invention is to provide a method capable of efficiently forming a multi-layer structure having a plurality of functions relying upon the compression-forming.

According to the present invention, there is provided a multi-layer structure having a base body resin layer of a thermoplastic resin and a functional resin layer of a functional resin, wherein the functional resin layer comprises a core layer of the base body resin or a second functional resin covered with a shell layer of a first functional resin, and the base body resin layer wraps the functional resin layer therein.

In the multi-layer structure of the present invention, it is desired that:
1. The multi-layer structure is a container closure comprising a top panel and a skirt portion hanging down from the peripheral edge of the top panel, the multi-layer structure is formed in at least the top panel and, particularly, a sealing member is formed on the inner surface of the top panel, the sealing member having a layer of a functional resin different from the functional resin used for the container closure;
2. The multi-layer structure is a preform including a mouth portion, a body wall and a bottom portion, and at least the body wall and the bottom portion are formed in the multi-layer structure; and
3. The functional resin is any one of a gas-barrier resin, an oxygen-absorbing resin, a cyclic olefin resin or a liquid crystal polymer.

According to the present invention, there is provided a method of producing a multi-layer structure obtained by press-forming a molten resin mass of a thermoplastic resin and a functional resin, wherein the molten resin mass is the one that wraps therein a functional resin mass which comprises a core layer of a base body resin or a second functional resin covered with a shell layer of a first functional resin.

In the method of producing a multi-layer structure of the present invention, it is desired that:
1. The multi-layer structure is a container closure comprising a top panel and a skirt portion hanging down from the peripheral edge of the top panel, and after the container closure is formed by compression-forming the molten resin mass, a sealing member is formed on the inner surface of the top panel by feeding and compressing a molten resin mass containing therein a functional resin different from the functional resin used for the molten resin mass; and
2. The functional resin is any one of a gas-barrier resin, an oxygen-absorbing resin, a cyclic olefin resin or a liquid crystal polymer.

The present invention is concerned with a multi-layer structure having a base body resin layer of a thermoplastic resin and a functional resin layer of a functional resin, wherein the functional resin layer comprises a core layer of the base body resin or a second functional resin covered with a shell layer of a first functional resin, and the base body resin layer wraps the functional resin layer therein.

As described above, the functional resin layer comprises the shell layer of the first functional resin and the core layer of the base body resin or the second functional resin, the shell layer covering the core layer, and the base body resin layer wrapping the functional resin layer therein. Therefore, the functional resin layer is allowed to exist near the surface of the structure, and the multi-layer structure permits the functional resin to effectively exhibit its function.

According to the present invention, further, the core layer which is the functional resin layer is formed by using a second functional resin different from the first functional resin that constitutes the shell layer to impart a multiplicity of functions to the multi-layer structure. As will be described later, for example, an oxygen-absorbing resin is used as the first functional resin, and a gas-barrier resin is used as the second functional resin thereby to efficiently absorb oxygen remaining in the container, to Shut off the permeation of oxygen from the exterior of the container through the container closure and, hence, to minimize the effect of oxygen upon the content.

According to the present invention, further, the base body resin can be used as the core layer which is the functional resin layer. In this case, a small amount of the functional resin can be permitted to exist efficiently near the surface of the multi-layer structure.

According to the method of producing a multi-layer structure of the invention, further, there can be efficiently formed by compression-forming a multi-layer structure permitting the layers of the functional resins to be formed at positions where they exhibit their functions to a sufficient degree, and having a multiplicity of functions.

BEST MODE FOR CARRYING OUT THE INVENTION

Figure 1:
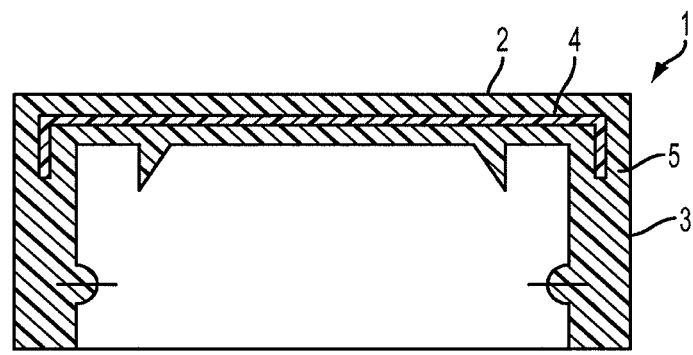
FIG. 1 is a side sectional view schematically illustrating a container closure which is a conventional multi-layer structure.
Figure 2:
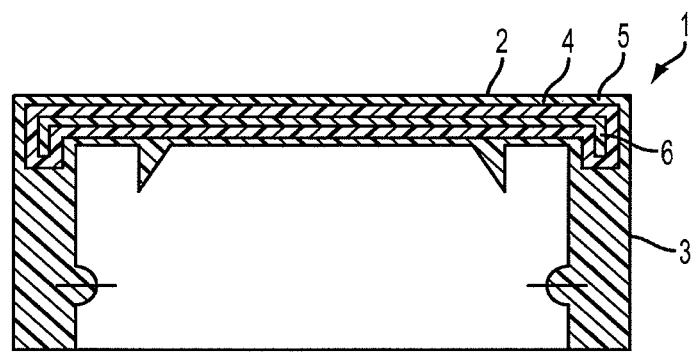
FIG. 2 is a side sectional view schematically illustrating a container closure which is a multi-layer structure of the present invention.

FIGS. 1 and 2 are side sectional views schematically illustrating container closures which are examples of the multi-layer structures. A container closure 1 includes a top panel 2 and a skirt portion 3. FIG. 1 illustrates a conventional container closure, and FIG. 2 illustrates a container closure of the present invention. In the container closures 1 of FIGS. 1 and 2, a layer 4 of a functional resin is existing in almost the whole region of the top panel 2 and in a portion of the skirt portion 3 in a state of being wrapped in a base body resin 5. In the conventional container closure comprising the base body resin and the functional resin shown in FIG. 1, the layer 4 of the functional resin is positioned in the central portion of the top panel 2. In the container closure of the present invention shown in FIG. 2, on the other hand, the functional resin is existing as a shell layer 4 covering the core layer 6 of the base body resin, the shell layer 4 of the functional resin existing being wrapped in the base body resin layer 5. It will therefore be obvious that the layer 4 of the functional resin is positioned on the surface side of the body wall as compared to the conventional container closure shown in FIG. 1.

It is desired that the above-mentioned multi-layer structure of the present invention is formed by the compression-forming. It is, here, important that the molten resin mass that is to be compression-formed is the one that wraps therein a functional resin mass which comprises a core layer of a base body resin or a second functional resin covered with a shell layer of a first functional resin. Upon compression-forming the molten resin mass having the above-mentioned structure, it is made possible to efficiently form a structure maintaining the above multi-layer structure.

Figure 3:
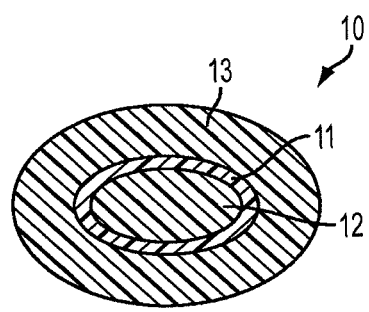
FIG. 3 is a diagram illustrating a sectional structure of a molten resin mass used for a method of producing a multi-layer structure of the present invention.

FIG. 3 is a diagram illustrating a sectional structure of a molten resin mass 10 used for the method of producing a multi-layer structure of the present invention by compression-forming, wherein a core layer 12 of a base body resin or a second functional resin is covered with a shell layer 11 of the first functional resin, and a functional resin layer comprising the shell layer 11 and the core layer 12 is wrapped in a base body resin 13.

In the multi-layer structure of the present invention, further, an adhesive layer is formed among the shell layer of the above first functional resin, the core layer of the base body resin or the second functional resin, and the base body resin layer, or between any two layers, from the standpoint of suppressing the peeling between the base body resin layer and the functional resin layer.

FIG. 4 is a view illustrating the production of the molten resin mass shown in FIG. 3. In a molten resin feeder portion 20 in the compression-forming apparatus, there are formed feed pipes 21 for feeding the base body resin, feed pipes 22 for feeding the first functional resin, and feed pipes 23 for feeding the second functional resin. The first functional resin feed pipes 22 and the second functional resin feed pipes 23 axe opened and closed at their molten resin flow-out ports by using a pin 24.

As will be understood from FIGS. 4(A) to 4(E), the base body resin 13 in the molten state is continuously fed through the feed pipes 21. Next, the pin 24 is raised in the direction of an arrow, whereby the flow-out ports of the first functional resin feed pipes 22 are opened permitting the first functional resin 11 to flow into the base body resin 13 (FIG. 4(B)). When the pin 24 is further raised in the direction of the arrow, the flow-out ports of the feed pipes 23 for feeding the second functional resin 12 are opened, whereby the second functional resin 12 flows into the first functional resin 11 that has been fed already. When the second functional resin flows out, the first functional resin is interrupted from flowing out through the feed pipes 22 (FIG. A(C)).

Figure 4C:
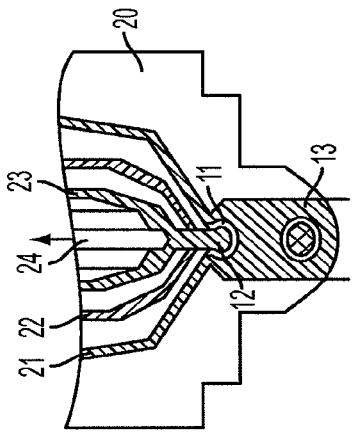
FIGS. 4(A)-4(E) are views illustrating the steps of producing the molten resin mass shown in FIG. 3.
Figure 4B:
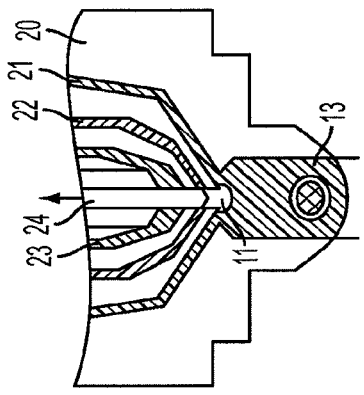
Figure 4E:
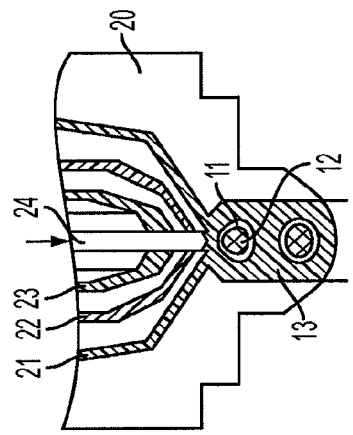
Figure 4A:
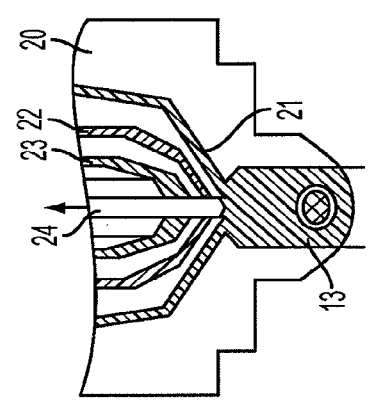
Figure 4D:
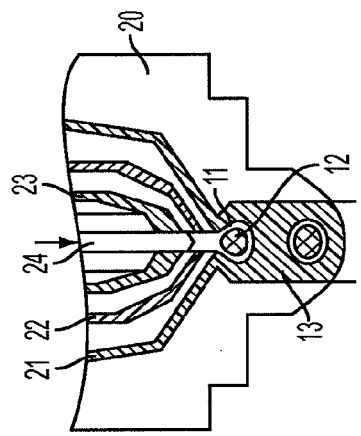

Next, when the pin 24 is lowered in the direction of an arrow, the flow-out ports of the second functional resin feed pipes 23 are closed, and the first functional resin flows in again (FIG. 4(D)). When the pin 24 is further lowered in the direction of the arrow, the flow-out ports of the first functional resin feed pipes 22 are closed, too, whereby the base body resin only is fed. Namely, in the base body resin, there is formed a molten resin flow forming a shell layer of the first functional resin and a core layer of the second functional resin (FIG. 4(E)). The portion where there is existing only the base body resin of the molten resin flow is cut by cutting means such as a cutter to form the molten resin mass of the structure shown in FIG. 3. The molten resin mass can be continuously fed into a compression-forming metal mold.

An adhesive layer may be formed among the shell layer of the first functional resin, the core layer of the base body resin or the second functional resin, and the base body resin layer, or between any two layers. Though not shown, the adhesive feed pipes for feeding a material that constitutes the adhesive layers are provided among the resin feed pipes for the shell layer, the core layer and the base body resin layer or between any two resin feed pipes for the layers. The flow-in ports of the adhesive material feed pipes are opened and closed by operating the pin like the above-mentioned pin 24 to feed the adhesive material.

Figure 5C:
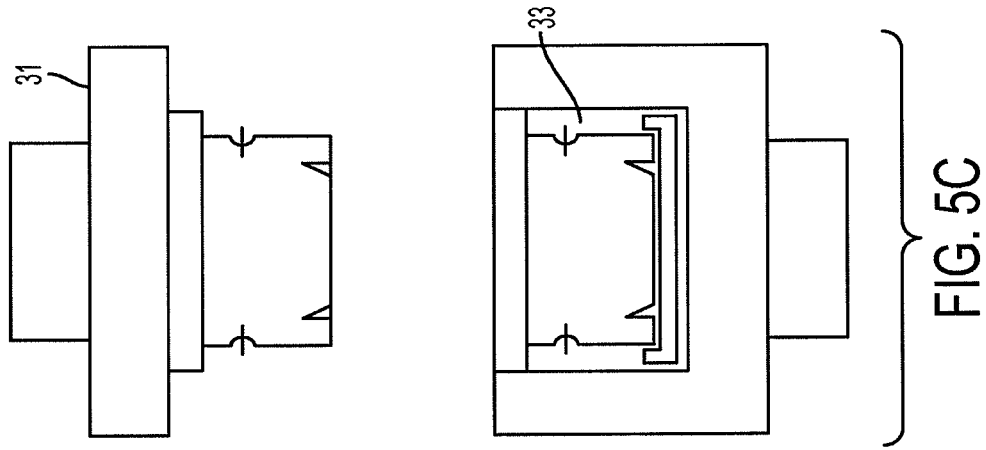
FIGS. 5(A)-5(C) are views schematically illustrating the steps of forming the container closure shown in FIG. 2 by using the molten resin mass shown in FIG. 3.
Figure 5B:
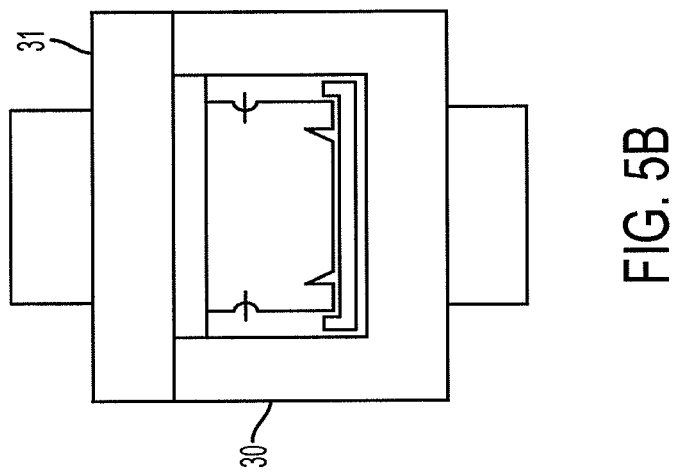
Figure 5A:
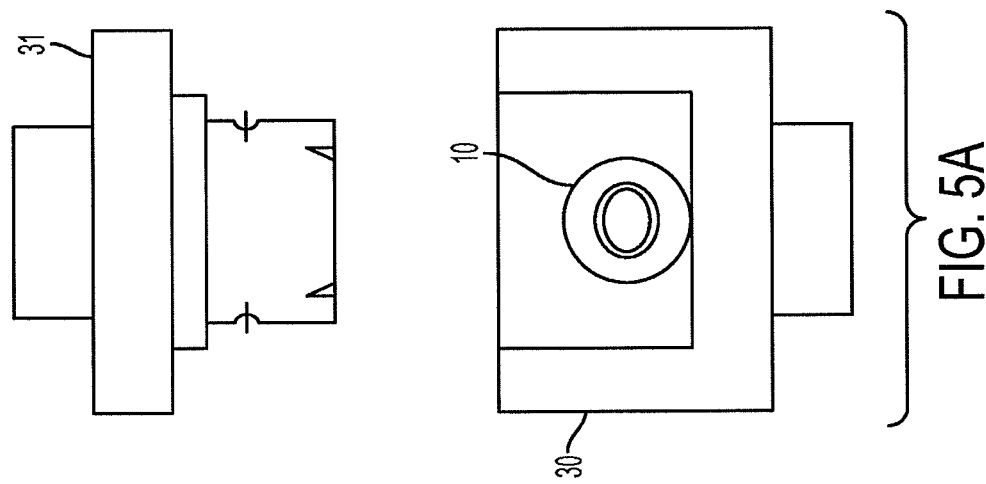

FIG. 5 is a view schematically illustrating the steps of forming the container closure shown in FIG. 2 by using the molten resin mass shown in FIG. 3. The molten resin mass 10 produced through the steps shown in FIG. 4 is fed by a molten resin mass feeding device into a compression-forming metal mold 30 (FIG. 5(A)). Next, a male mold 31 descends, compresses the molten resin mass 10 into the shape of a container closure in cooperation with the metal mold 30 (FIG. 5(B)). Thereafter, the male mold 31 is raised to separate away from the metal mold 30, and a container closure 33 is formed (FIG. 5(C)).

In the present invention, a sealing member is integrally formed on the inner surface of the container closure by feeding a molten resin mass onto the inner surface of the top panel of the container closure formed by the above method, the molten resin mass containing therein a functional resin different from the functional resin used for the molten resin mass for forming the container closure, and compression-forming it thereon. By using a functional resin different from the functional resin used for the container closure, a multiplicity of functions can be imparted to the container closure.

Figure 6A:
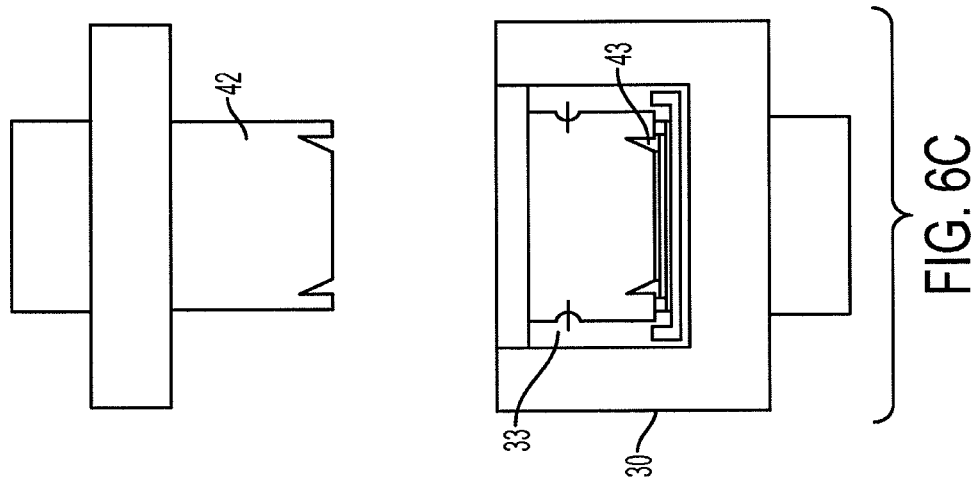
FIGS. 6(A)-6(C) are views schematically illustrating the steps of forming a sealing member on the inner surface of the top panel of the container closure formed through the steps illustrated in FIG. 5.
Figure 6B:
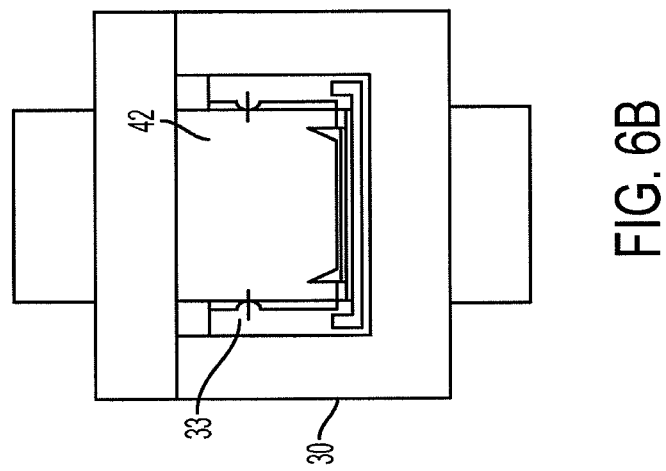
Figure 6C:
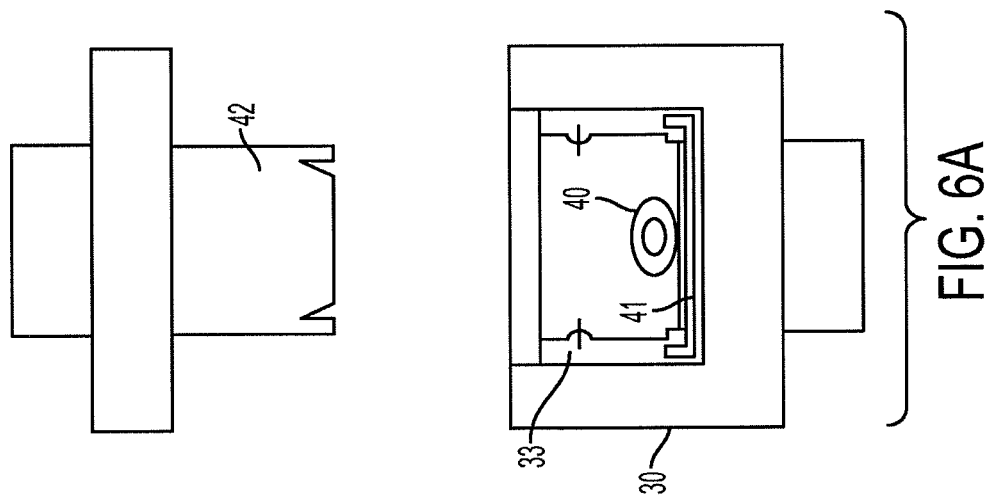

FIG. 6 is a view schematically illustrating the steps of forming a sealing member on the inner surface of the top panel of the container closure formed through the steps shown in FIG. 5. A molten resin mass 40 produced through the steps shown in FIG. 4 is fed onto the top panel 41 of the container closure 33 in the compression-forming metal mold 30 (FIG. 6(A)). A male mold 42 for forming the sealing member descends, and compresses the molten resin mass 40 into the shape of a sealing member in cooperation with the metal mold 30 and the container closure 33 (FIG. 6(B)). Thereafter, the male mold 42 is raised to separate away from the metal mold 30 and the container closure 33, and there is formed the container closure 33 having a sealing member 43 formed thereon (FIG. 6(C)).

(Layer Constitution)

In the multi-layer structure of the present invention, an important feature resides in that the base body resin wraps therein the functional resin layer which comprises the shell layer of the first functional resin and the core layer of the second functional resin or the base body resin, Further, an adhesive layer may be formed as described above.

Though there is no particular limitation, examples of the combination of the shell layer and the core layer (shell/core) include oxygen-absorbing resin/base body resin, oxygen-absorbing resin/gas-barrier resin, oxygen-absorbing resin/cyclic olefin resin, oxygen-absorbing resin/liquid crystal polymer, gas-barrier resin/base body resin, gas-barrier resin/cyclic olefin resin, gas-barrier resin/liquid crystal polymer, gas-barrier resin/oxygen-absorbing resin, cyclic olefin resin/base body resin, and liquid crystal polymer/base body resin.

In forming the above layer structure, the ratio of the base body resin, first functional resin and second functional resin varies depending upon the function to be imparted to the multi-layer structure and the use of the multi-layer structure, and cannot be exclusively defined. When the container closure shown in FIG. 1 is to be formed, however, it is desired that the weight ratio of the base body resin and the functional resin in the state of a molten mass is in a range of 99:1 to 70:30.

In the case of the container closure having the sealing member formed by the above method, though not limited thereto only, the functional resin used for the container closure may be any one of the gas-barrier resin, liquid crystal polymer or cyclic olefin resin, or a combination thereof, and the sealing member may contain an oxygen-absorbing resin in the base body resin that constitutes the sealing member.

That is, in the container closure, use of the gas-barrier resin interrupts the permeation of oxygen from the outer side, use of the liquid crystal polymer improves the mechanical strength and use of the cyclic olefin resin interrupts the permeation of water vapor from the outer side. In the sealing member, on the other hand, use of the oxygen-absorbing resin effectively traps oxygen remaining in the container, and there is provided the container closure with the sealing member having excellent properties stemming from the functions of the container closure and the sealing member.

The molten resin mass forming the sealing member may form a multi-layer structure like the above-mentioned molten resin mass, or may form a structure in which the functional resin is dispersed much in the base body resin.

(Base Body Resin)

The base body resin that can be used for the present invention may be any thermoplastic resin that has heretofore been used for the containers, container closures and sealing members such as liners.

Concretely, there can be used those resins that can be melt-formed and crystallized, such as polyolefin resin, thermoplastic polyester resin, polycarbonate resin, and polyacrylonitrile resin. When the container closures and the sealing members are to be formed, in particular, there can be used a polyolefin resin. When the preforms are to be formed, a thermoplastic polyester resin can be preferably used.

Examples of the polyolefin resin include polyethylenes such as low-density polyethylene (LDPE), medium-density polyethylene (MDPE), high-density polyethylene (HDPE), linear low-density polyethylene (LLDPE) and linear very low-density polyethylene (LVLDPE), as well as polypropylene (PP), ethylene/propylene copolymer, polybutene-1, ethylene/butene-1 copolymer, propylene/butene-1 copolymer, ethylene/propylene/butene-1 copolymer, ethylene/vinyl acetate copolymer, ionically crosslinked olefin copolymer (ionomer) and blends thereof.

It is desired that the polyolefin resin has a melt flow rate (MFR) of 0.1 to 25 g/10 min. from the standpoint of extrusion property.

Examples of the thermoplastic polyester resin include thermoplastic polyesters such as polyethylene terephthalate, polybutylene terephthalate and polyethylene naphthalate, as well as blends of these polyesters and a polycarbonate or an arylate resin. In the present invention, it is desired to use a polyethylene terephthalate (PET) polyester in which a majority proportion (usually, not less than 80 mol % and, particularly, not less than 80 mol %) of the ester recurring units is an ethylene terephthalate unit, and having a glass transition point (Tg) of 50 to 90° C. and, particularly, 55 to 80° C. and a melting point (Tm) of 200 to 275° C. and, particularly, 220 to 270° C.

As the PET polyester, a homopolyethylene terephthalate is best suited. However, a copolymerized polyester, too, can be used provided the content of the ethylene terephthalate unit is within the above range.

In the above copolymerized polyester, examples of the dibasic acid other than terephthalic acid include aromatic dicarboxylic acids such as isophthalic acid, phthalic acid and naphthalenedicarboxylic alicyclic dicarboxylic acids such as cyclohexanedicarboxylic acid; aliphatic dicarboxylic acids such as succinic acid, adipic acid, sebacic acid, and dodecane dioic acid, which may be used in one kind or in a combination of two or more kinds. As the diol component other than the ethylene glycol, there can be exemplified propylene glycol, 1,4-butanediol, diethylene glycol, 1,6-hexylene glycol, cyclohexane dimethanol, and ethylene oxide adduct of bisphenol A, which may be used in one kind or in two more kinds.

(Functional Resins)

The functional resins are used for imparting some performance to the multi-layer structure of the present invention, and stand for the resins different from the above-mentioned base body resin. Concretely, there can be exemplified resins such as gas-barrier resin, oxygen-absorbing resin and cyclic olefin resin having excellent water vapor-barrier property, as well as resins having excellent rigidity and heat resistance like liquid crystal polymers.

[Gas-Barrier Resin]

A representative example of the gas-barrier resin may be an ethylene/vinyl alcohol copolymer, such as a saponified product of a copolymer obtained by saponifying an ethylene/vinyl acetate copolymer having an ethylene content of 20 to 60 mol % and, particularly, 25 to 50 mol % so as to possess a saponification degree of not lower than 96% and, particularly, not lower than 99 mol %. The ethylene/vinyl alcohol copolymer (saponified product of an ethylene/vinyl acetate copolymer) must have a molecular weight large enough for forming a film and must desirably possess an inherent viscosity of not smaller than 0.01 dL/g and, particularly, not smaller than 0.05 dL/g as measured in a mixed solvent of phenol and water at a weight ratio of 85/15 at 30° C.

As the gas-barrier resin other than the ethylene/vinyl alcohol copolymer, further, there can be exemplified polyamides such as nylon 6, nylon 6.6, nylon 6/6.6 copolymer, metaxylylenediadipamide (MXD6), nylon 6.10, nylon 11, nylon 12 and nylon 13. Among these polyamides, it is desired to use the one having amide groups in a number of 5 to 50 and, particularly, 6 to 20 per 100 carbon atoms.

These polyamides, too, must have molecular weights large enough for forming a film, and must desirably have a relative viscosity of not smaller than 1.1 and, particularly, not smaller than 1.5 as measured in the concentrated sulfuric acid (concentration of 1.0 g/dL) at 30° C.

[Oxygen-Absorbing Resin]

As the oxygen-absorbing resin, there can be exemplified a resin composition blended with an oxygen absorber, and a resin composition comprising at least an oxidizing organic component and a transition metal catalyst Oxidizing catalyst).

As the oxygen absorber-blended resin composition, there can be exemplified the above base body resin blended with a conventional oxygen absorber such as an iron-type oxygen absorber.

The resin composition containing the oxidizable organic component and the transition metal catalyst may the oxidizable organic component and the transition metal catalyst only, but may further contain resins other than those described above.

As the resin that can be used in combination with the oxidizable organic component and the transition metal catalyst, there can be exemplified the olefin resin and the gas-barrier resin described above. In particular, it is desired to use the ethylene/vinyl alcohol copolymer and the polyamide resin. Among them, it is desired to use a xylylene group-containing polyamide resin having a terminal amino group concentration of not smaller than 40 eq/$10^6$ g since it is not deteriorated by oxidation even when it has absorbed oxygen.

(i) Oxidizable Organic Component.

As the oxidizable organic component, there can be exemplified an ethylenically unsaturated group-containing polymer. This polymer has a carbon-carbon double bond. The portion of the double bond and, particularly, α-methylene neighboring the double-bonded portion are easily oxidized with oxygen thereby to trap oxygen.

The ethylenically unsaturated group-containing polymer is derived from a monomer of, for example, polyene. There can be used, as the oxidizable polymer, a random copolymer or a block copolymer in combination with a homopolymer of polyene, in combination with two or more kinds of the above polyene, or in combination with other monomers.

Among the polymers derived from the polyene, there can be preferably used polybutadiene (BR), polyisoprene (IR), natural rubber, nitrile/butadiene rubber (NBR), styrene/butadiene rubber (SBR), chloroprene rubber, ethylene/propylene/diene rubber (EPDM) and the like, though the invention is in no way limited thereto only, as a matter of course.

In addition to the above ethylenically unsaturated group-containing polymer, there can be used, as the oxidizable organic component, a polymer which by itself can be easily oxidized, such as polypropylene, ethylene/propylene copolymer or polymetaxylylenediadipamide having a terminal amino group concentration of smaller than 40 eq/$10^6$ g.

From the standpoint of formability, it is desired that the above oxidizable polymer or the copolymer thereof has a viscosity at 40° C. over a range of 1 to 200 Pa·s.

It is desired that the polyene polymer is an acid-modified polyene polymer into which a carboxylic acid group, an anhydrous carboxylic acid group or a hydroxyl group has been introduced.

It is desired that the oxidizable polymer or the oxidizable organic component comprising a copolymer thereof is contained in the oxygen-absorbing resin at a ratio of 0.01 to 10% by weight.

(ii) Transition Metal Catalyst.

As the transition metal catalyst, there can be preferably used metals of the group VIII of periodic table, such as iron, cobalt and nickel. There can be further used metals of the group I, such as copper and silver, metals of the group IV, such as tin, titanium and zirconium, metals of the group V, such as vanadium, metals of the group VI, such as chrome, and metals of the group VII, such as manganese.

The transition metal catalyst is used, usually, in the form of an inorganic salt, an organic salt or a complex of a low valency of the above transition metal. As the inorganic salt, there can be exemplified halides such as chlorides, oxy salts of sulfur such as sulfates, oxyacid salts of nitrogen, such as nitrates, phosphorus oxy salts such as phosphates, and silicates. As the organic salt, there can be exemplified carboxylate, sulfonate and phosphonate. As the complex of a transition metal, further, there can be exemplified a complex with β-diketone or β-ketoacid ester.

It is desired that the transition metal catalyst has a concentration of transition metal atoms (on the basis of weight concentration) of in a range of 100 to 3000 ppm in the oxygen-absorbing resin.

[Other Functional Resins]

As the functional resins that can be favorably used for the present invention, there can be exemplified acyclic olefin resin and a liquid crystal polymer in addition to the gas-barrier resin and the oxygen-absorbing resin.

The cyclic olefin resin usually exhibits various properties such as heat resistance, moisture resistance and water vapor-barrier property superior to those of the general-purpose thermoplastic resins. Use of the cyclic olefin resin makes it possible to impart excellent properties to the multi-layer structure.

As the cyclic olefin, there can be used a known cyclic olefin that has heretofore been used for the packaging containers. Usually, there can be used a saturated polymer obtained by polymerizing an alicyclic hydrocarbon compound having an ethylenically unsaturated bond and a bicyclic ring, i.e., by polymerizing a so-called norbornene monomer relying upon a known ring-opening polymerization method followed by the hydrogenation.

As the cyclic olefin resin, further, there can be used a copolymer of olefin and cyclic olefin in addition to the homopolymer of a cyclic olefin. Ethylene is a preferred example of the olefin for deriving an amorphous or low crystalline copolymer (COO) of olefin and cyclic olefin. Preferably, there can be further used an α-olefin having 3 to 20 carbon atoms, such as propylene, 1-butene, 1-pentene, 1-hexene, 1-octene, 3-methyl 1-pentene and 1-decene in one kind or in combination with the ethylene.

A preferred cyclic olefin resin is available from Mitsui Petrochemical Co. in the trade name of APEL.

Further, the liquid crystal polymer usually exhibits various properties such as rigidity, heat resistance and barrier property superior to those of the general-purpose thermoplastic resins. Use of the liquid crystal polymer makes it possible to impart excellent properties to the multi-layer structure.

As the liquid crystal polymer, there can be used a high molecular liquid crystal polymer that exhibits liquid crystallinity in a state of solution or in a molten state, such as a known lyotropic liquid crystal polymer and a thermotropic liquid crystal polymer.

Concretely, there can be exemplified (a) the one obtained by reacting an aromatic dicarboxylic acid, an aromatic diol and an aromatic hydroxycarboxylic acid, (b) the one by reacting aromatic hydroxycarboxylic acids of different kinds, (c) the one obtained by reacting an aromatic dicarboxylic acid with an aromatic diol, and (d) the one obtained by reacting a polyester such as polyethylene terephthalate with an aromatic hydroxycarboxylic acid, to which only, however, the invention is not limited, as a matter of course.

[Adhesive Layer Resin]

As the adhesive layer, there can be exemplified acid-modified polyolefins such as acid-modified polypropylene, acid-modified high-density polyethylene, acid-modified low-density polyethylene and acid-modified ethylene/vinyl acetate copolymer, to which only, however, the invention is in no way limited.

(Multi-Layer Structure)

The multi-layer structure of the present invention can assume a variety of forms such as a container, a preform, a sealing member (liner member), etc. in addition to the container closure described above.

Concerning the containers, the above-mentioned molten resin mass can be directly formed into articles of various shapes such as a cup, a tray and the like relying upon the compression-forming. Here, what is important is that the above-mentioned multi-layer structure is formed at least in the body walls and in the bottom portions.

Further, the preform includes the container mouth portion, body wall and the bottom portion and it is important that the above-mentioned multi-layer structure is formed in at least the body wall and the bottom portion. As required, the mouth portion is thermally crystallized and is, then, subjected to the draw-forming such as biaxial draw blow-forming to form bottles, cups and the like.

Further, the sealing member can be formed in a shape such as a flat plate that can be applied to a cap shell that is separately formed.

(Forming Conditions)

In addition to feeding the molten resin mass having the above multi-layer structure to the compression-forming machine to effect the compression-forming, the multi-layer structure of the present invention can also be formed relying upon a conventional known compression-forming method.

The temperature (die head temperature) for extruding the molten resin may differ depending upon the kind of the resin that is used but is, usually, desired to be in a range of Tm+20° C. to Tm+60° C. based on the melting point (Tm) of the base body resin. When the temperature is lower than the above range, the shearing rate becomes so great that it becomes difficult to form a uniformly melt-extruded article. When the temperature is higher than the above range, on the other hand, the resin is deteriorated to a large degree and the draw-down becomes very great, which is not desirable.

Further, the surface temperature of the compression-forming mold may be a temperature at which the molten resin is solidified and is, usually, in a range of 10 to 50° C.

EXAMPLES

[Method of Evaluation]
1. Amount of Oxygen Permeation.

A cap was fitted in a nitrogen gas atmosphere onto the mouth-and-neck portion of a glass container of a content of 200 cc, and an oxygen concentration in the container just after the cap was fitted was measured by using a gas coulometer [GC-3BT, Manufactured by Shimazu Seisakusho Co.].

Next, the container to which the cap has been fitted was left to stand in an atmosphere of a temperature of 30° C. and a humidity of 80% for 10 days, and an oxygen concentration in the container was similarly measured. The amount the oxygen has permeated in 10 days was calculated from the above oxygen concentration, and an average amount of oxygen permeation per day (cc/Cap/day) was found.

Example 1

A polypropylene resin (PP) that serves as a base body resin for forming the cap, an ethylene/vinyl alcohol copolymer (EVOH) that serves as a first functional resin for forming the shell layer, and a polypropylene resin that is a base body resin for forming the core layer, were plasticized by using an extruder, and were fed to a multi-layer die system shown in FIG. 4 to form 3 g of a multi-layer molten resin mass of the base body resin and the functional resin at a weight ratio of 97:3, as shown in a sectional view of FIG. 3.

The multi-layer molten resin mass was arranged in a metal mold cavity shown in FIG. 5, compression-formed by using a male mold, and was cooled to form a cap shown in FIG. 2 having sizes as described below, and was evaluated.

Height: 20 mm
Mouth diameter: 28 mm
Average thickness of the top panel: 2 mm
Average thickness of the shell layer: 0.07 mm
Average thickness of the core layer: 0.66 mm Example 2

A cap was formed and evaluated in the same manner as in Example 1 but by using a cyclic olefin as a second functional resin of the core layer.

Comparative Example 1

A cap was formed and evaluated in the same manner as in Example 1 but forming a functional resin layer of an ethylene/vinyl alcohol copolymer (EVOH) of an average thickness of 0.14 mm in the central portion of the thickness of the top panel to form the cap of the multi-layer structure shown in FIG. 1 without forming the core layer.

Comparative Example 2

A cap was formed and evaluated in the same manner as in Example 2 but forming a functional resin layer of an ethylene/vinyl alcohol copolymer (EVOH) having an average thickness of 0.14 mm, an intermediate base body resin layer having an average thickness of 0.2 mm and a functional resin layer of a cyclic olefin having an average thickness of 0.3 mm successively from the upper side in the central portion of the thickness of the top panel to form the cap of the multi-layer structure shown in FIG. 1.

TABLE 1

| | Amount of oxygen permeation (cc/cap/day) |
|---|---|
| Example 1 | 0.001 |
| Example 2 | 0.001 |
| Comp. Example 1 | 0.004 |
| Comp. Example 2 | 0.004 |

The invention claimed is:

1. A method of producing a multi-layer structure by press-forming a molten resin mass of a thermoplastic resin and a functional resin, wherein said molten resin mass is the one that wraps therein a functional resin mass which comprises a core layer of a base body resin or a second functional resin covered with a shell layer of a first functional resin, said functional resin is a molten resin mass comprising any one of a gas-barrier resin, an oxygen-absorbing resin, a cyclic olefin resin or a liquid crystal polymer, and said molten resin mass is formed by continuously feeding the base body resin in a molten state, flowing the first functional resin into the interior of the base body resin, flowing the second functional resin or the base body resin into the interior of the first functional resin that has been fed already, and halting the flow out of the first functional resin by flowing out the second functional resin or the base body resin; flowing the first functional resin in again by halting the flow out of the second functional resin or the base body resin; halting the flow out of the first functional resin and feeding the base body resin only; and forming, in the base body resin, a molten resin flow in which a shell layer of the first functional resin and a core layer of the second functional resin or the base body resin are formed, and cutting away a portion of said molten resin flow in which only the base body resin is present; said first or second functional resin comprising any one of a gas-barrier resin, an oxygen-absorbing resin, a cyclic olefin resin or a liquid crystal polymer.

2. A method of producing a multi-layer structure according to claim 1, wherein said multi-layer structure is a container closure comprising a top panel and a skirt portion hanging down from the peripheral edge of the top panel, and after the container closure is formed by compression-forming said molten resin mass, a sealing member is formed on the inner surface of the top panel by feeding and compressing a molten resin mass containing therein a functional resin different from the functional resin used for said molten resin mass.

* * * * *